United States Patent [19]

Tabony

[11] Patent Number: 4,783,150
[45] Date of Patent: Nov. 8, 1988

[54] THERMALLY ELECTRICALLY OR MAGNETICALLY CONTROLLABLE LYOTROPIC LIQUID CRYSTAL OPTICAL DEVICES

[75] Inventor: James Tabony, Villebon/Yvette, France

[73] Assignee: Commissariat a l'Energie Atomique, Paris, France

[21] Appl. No.: 113,288

[22] Filed: Oct. 26, 1987

[30] Foreign Application Priority Data

Nov. 7, 1986 [FR] France .................. 86 15594

[51] Int. Cl.⁴ .............................................. G02F 1/13
[52] U.S. Cl. ................................. 350/351; 350/350 R; 252/310; 252/312; 252/315.4
[58] Field of Search .............. 350/350 R, 351; 252/310, 312, 315.4, 318, 367

[56] References Cited

U.S. PATENT DOCUMENTS

| | | | |
|---|---|---|---|
| 3,533,399 | 10/1970 | Goldberg et al. | 350/351 X |
| 3,576,761 | 4/1971 | Davis | 350/351 X |
| 3,600,060 | 2/1968 | Churchill et al. | 350/351 X |
| 3,764,540 | 10/1973 | Khalafalla et al. | 252/62.55 |
| 3,969,264 | 7/1976 | Davis | 350/351 X |
| 4,019,994 | 4/1977 | Kelley | 252/62.52 |
| 4,022,706 | 5/1977 | Davis | 350/351 X |
| 4,285,819 | 8/1981 | Yen et al. | 210/679 |
| 4,382,802 | 5/1983 | Beinke et al. | 252/312 X |
| 4,472,291 | 9/1984 | Rosano | 252/312 X |
| 4,655,931 | 4/1987 | Kawamoto | 252/310 X |
| 4,688,900 | 8/1987 | Doane et al. | 350/351 X |

FOREIGN PATENT DOCUMENTS

2316642 1/1977 France .
2462725 2/1981 France .

OTHER PUBLICATIONS

Search Report 86 15 593 Including Annexure Chemical Abstracts, vol. 90, No. 22.

Primary Examiner—Stanley D. Miller
Assistant Examiner—Richard F. Gallivan
Attorney, Agent, or Firm—Ladas & Parry

[57] ABSTRACT

Thermally, electrically or magnetically controllable lyotropic liquid crystal optical devices.

The optical device comprises two insulating walls (6, 8) joined together by their edges by means of a sealing joint (9) and a lyotropic liquid crystal film (10) placed between the walls and whose light transmission varies as a function of the temperature, said liquid crystal being formed from 5 to 20% by weight of alcohol, 0 to 20% by weight of a quaternary ammonium halide, 0 to 94% by weight of oil and 1 to 95% by weight of water, the ratio of the mass of ammonium halide to the mass of alcohol being below 2.

30 Claims, 4 Drawing Sheets

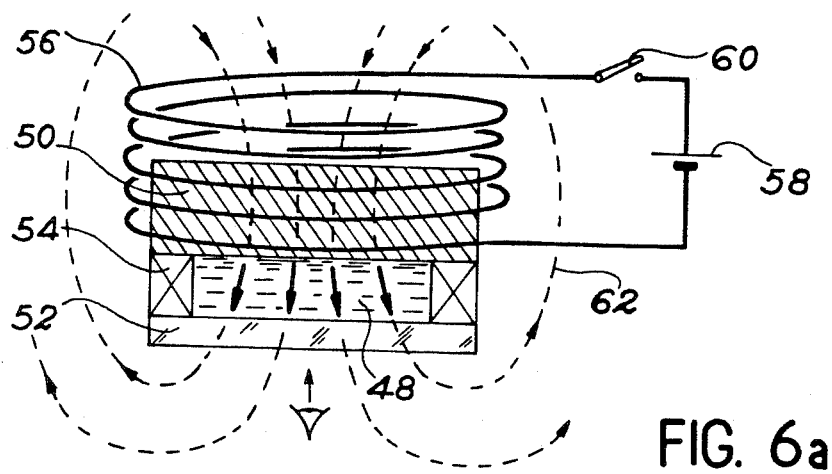
FIG. 6a
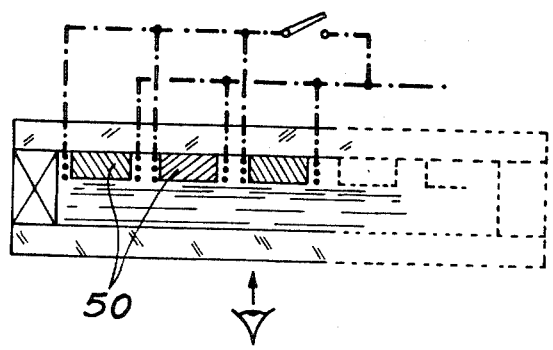
FIG. 6b
FIG. 7
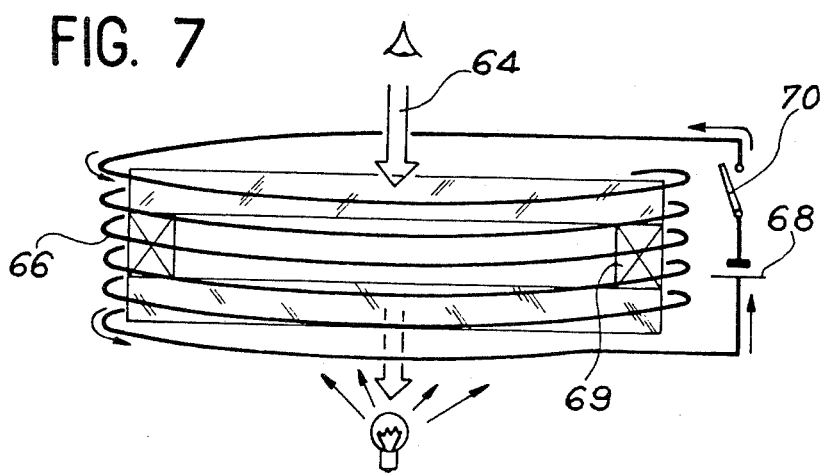

THERMALLY ELECTRICALLY OR MAGNETICALLY CONTROLLABLE LYOTROPIC LIQUID CRYSTAL OPTICAL DEVICES

BACKGROUND OF THE INVENTION

The present invention relates to thermally, electrically and/or magnetically controllable lyotropic liquid crystal optical devices.

It more particularly applies in the display field, both as regards alphanumeric characters and more complex images, in the agricultural-food field for producing greenhouses, in the dwelling field for producing windows and in the field of bubble memories. The optical devices according to the invention can also be used for producing image converters, electrooptical or magnetooptical switches, spectacle lenses, or other variable transmission objects, etc.

The optical devices according to the invention can be used in all wavelengths from the infrared to the ultraviolet, whilst passing through the visible.

The liquid crystals are grouped into two main classes, namely thermotropic and lyotropic liquid crystals.

In thermotropic liquid crystals, the different crystalline phases are obtained by heating or cooling a given molecular compound (p-n-pentylcyanodiphenyl or p-azoxyanisole for example) or a mixture of compounds individually having liquid crystal properties. Examples of known thermotropic liquid crystals are nematics, smectics and cholesterics.

Lyotropic liquid crystals differ from thermotropic liquid crystals by the fact that they are constituted by a mixture of compounds not in themselves having liquid crystal properties.

Lyotropic liquid crystals are often constituted by a mixture of water and a surfactant. In such liquid crystals, the surfactant molecules are aggrevated and the aggregates organized to form a crystal lattice.

Known lyotropic liquid crystals are mesophases having lamellar, hexagonal, cubic and nematic structures. Often lyotropic liquid crystals contain more than 50% by weight of surfactants. In addition, their viscosity is often high, which makes their macroscopic orientation difficult.

The presently known lyotropic liquid crystals have never been used in optical devices, which is not the case with thermotropic liquid crystals.

The main reason is that they contain a large amount of water, that they have a high electrical conductivity and that the application of an electric field to these liquid crystals leads to an electrolysis of the water, whilst the electrical control is the most widely used in such devices.

The problem in thermotropic liquid crystals is of synthesizing molecules having a desired mesophase with a liquid crystal structure for the chosen operating temperature and which also have appropriate physical properties for the orientation of the molecules, such as a low viscosity.

Moreover, the presently used liquid crystals are formed by relatively expensive compounds giving a high price to the devices based on such liquid crystals.

SUMMARY OF THE INVENTION

The invention relates to inexpensive liquid crystal optical devices. In addition, these liquid crystals are lyotropic liquid crystals.

More specifically, the invention relates to an optical device having a liquid crystal which has two stable optical states, namely a transparent state and an opaque state which can be controlled, characterized in that the liquid crystal has a lamellar structure in the transparent state and a nematic lamellar structure in the opaque state, said two states being thermally controllable and that it contains 1 to 45% by weight of a surfactant, 0 to 45% by weight of a co-surfactant, 0 to 98% by weight of oil and 1 to 99% by weight of polar liquid, the ratio of the co-surfactant mass to the surfactant mass being below 2.

This optical device can be a greenhouse, windows for domestic or industrial use, spectacle lenses or a display device for point-by-point or alphanumeric characters.

A raising or conversely a lowering of the temperature of the device makes it possible to pass from the transparent state to the opaque state and vice versa. The temperature differences for passing from the transparent state to the opaque state are in particular 20° to 40° C. The opaque state corresponds to a state where the liquid crystal is at its stability limit.

Preferably, the liquid crystal contains 5 to 20% by weight of surfactant, 0 to 20% by weight of co-surfactant, 0 to 94% by weight of oil and 1 to 95% by weight of polar liquid.

In this device, the polar liquid can constitute the dispersed phase and the oil and continuous phase. In the same way, the oil can constitute the dispersed phase and the polar liquid the continuous phase.

Between the lamellar structure, generally obtained at low temperature, and the nematic lamellar structure, generally obtained at a higher temperature, the aforementioned liquid crystals have a structure comparable to that of nematics, the constituents of the liquid crystals being grouped into aggregates having a magnetic anisotropy and a dielectric anisotropy.

Thus, the invention also relates to an optical device having a liquid crystal with two stable states which can be controlled, characterized in that said liquid crystal is a nematic containing 1 to 45% by weight of surfactant, 1 to 45% by weight of co-surfactant, 1 to 97% by weight of oil and 1 to 97% by weight of a polar liquid, the ratio of the co-surfactant mass to the surfactant mass being below 2 and the four constituents form elongated aggregates, dispersed in a continuous liquid phase, whose length exceeds the distance separating two consecutive aggregates, the orientation of these aggregates being electrically or magnetically controllable.

Magnetic control also includes electromagnetic control.

This device is in particular a display device for alphanumeric or matrix characters.

The lyotropic liquid crystals according to the invention with water as the polar agent can be used in electrically controlled devices, provided that the water constitutes the dispersed phase and the oil constitutes the continuous phase. Thus, in this particular case, the inventor has found that no electrolysis of the water takes place.

To this end, the liquid crystals according to the invention, whereof the orientation of the aggregates is electrically controllable contain 1 to 45% by weight of surfactant, 1 to 45% by weight of co-surfactant, 50 to 97% by weight of oil and 1 to 48% by weight of water.

In a magnetically controlled optical device, it is preferable for the lyotropic liquid crystal to contain ferromagnetic particles, the latter being located within the aggregates. The aggregates can be in the form of plates, rods, ellipsoids or elongated cylinders, whereof the length varies from 3 to more than 300 nm. According to the invention, the distance separating two consecutive aggregates is between 7 and 200 nm and preferably varies between 10 and 30 nm.

The introduction of ferromagnetic particles into the aggregates of the lyotropic liquid crystal usable in a device according to the invention makes it possible to increase the optical birefrigence and the magnetic and dielectric anistropies, which is very interesting in the field of electrically or magnetically controlled display.

The ferromagnetic particles can be particles of iron, cobalt, chromium dioxide, nickel, ferric oxide, magnetite or cobalt oxide. Preferably the ferromagnetic particles are magnetite particles. Advantageously, the electrically or magnetically controllable liquid crystal contains 5 to 20% by weight of surfactant, 1 to 20% by weight of co-surfactant, 50 to 93% by weight of oil and 1 to 44% by weight of polar liquid.

In the optical devices according to the invention, which are thermally, electrically or magnetically controllable, the polar liquid used is preferably water. However, other polar liquids such as ammonia, ethylene glycol, formamide, glycerol, ethanol, a mixture of these polar liquids or an aqueous solution thereof can also be used.

In order to vary the ionic forces between the oil, the polar liquid and the surfactant, an electrolyte can be added to the polar liquid. This electrolyte represents 1 to 40% by weight of the polar liquid and preferably 1 to 10% by weight.

This electrolyte is in particular an organic salt, such as an alkali metal salt, e.g. sodium chloride, sodium bromide, sodium sulphate, potassium chloride or potassium bromide. This electrolyte can also be a basic hydroxide, such as ammonium hydroxide. Finally, it is also possible to use an organic salt, such as $N(CH_3)_4Br$ as the electrolyte.

According to the invention, any type of surfactant can be used, no matter whether they are anionic cationic or nonionic, These surfactants are in particular fatty acid salts with a long hydrocarbon or fluorocarbon chain, long chain amine salts, quaternary ammonium halides having at least one long chain hydrocarbon substituent, alkyl sulphates or sulphonates of an alkali metal and phospholipids. Preferably, the carbon chain contains 5 to 20 carbon atoms. In addition, the carbon chain can be saturated or unsaturated.

An example of a surfactant with a saturated carbon chain is sodium dodecyl sulphate and tetradecyl trimethyl ammonium bromide. An example of a surfactant with an unsaturated carbon chain is potassium oleate.

It is also possible to use multiple chain compounds, such as e.g. sodium bis-(2-ethylhexyl)-sulphosuccinate, known under the abbreviation A.O.T.

It is also possible to use commercial soaps and sulphonated petroleum oils, such as sodium hexyl benzosulphonate.

The potassium oleate, A.O.T. and sulphonated petroleum oils are very good surfactants with the advantage of being industrially produced in large quantities and at a very low price.

With the exception of certain surfactants, such as A.O.T., which serve both as surfactant and co-surfactant, it is necessary to associate a co-surfactant with the surfactant.

The co-surfactants usable in the invention are monohydroxylated or polyhydroxylated alcohols, amines, aminoalcohols, carboxylic acids and monofunctional or polyfunctional ethers, said compounds having a short carbon chain, or a mixture thereof. The length of the carbon chain in particular contains 1 to 20 carbon atoms.

Preferred co-surfactants are a monoalcohol, such as ethanol, butanol, pentanol, hexanol, heptanol, octanol, decanol, or a mixture thereof. Advantageously, use is made of butanol, pentanol or hexanol.

Alcohols, which are polar liquids, can serve both as a co-surfactant and as a polar liquid according to the invention.

According to the invention, the oil used is a saturated or unsaturated cyclic hydrocarbon, as well as fluorine derivatives of these hydrocarbons. The carbon chain of these hydrocarbons contains 5 to 30 carbon atoms.

Preferably the hydrocarbon is an alkane or an aromatic derivative and it is e.g. possible to use benzene, toluene, cyclohexane, octane and decane.

The oils, surfactants and co-surfactants and optionally the aforementioned ferromagnetic particles, as well as the water are readily commercially available at low price. This makes it possible to produce relatively uncomplicated optical liquid crystal devices.

The liquid crystals according to the invention are completely suitable for both alphanumeric and matrix display, because they have a relatively low viscosity. Their viscosity is between 0.1 and 100 and preferably between 1 and 30 centipoises. This low viscosity permits in the case of a magnetic or electric control to easily orient the aggregates in a desired direction.

Moreover, the liquid crystals according to the invention have a good memory effect, which is not the case with a large number of known liquid crystals, which obviates the need for numerous refreshing operations for the display means. Thus, these liquid crystals remain oriented for a long time, even after eliminating the electric or magnetic excitation.

During the use of devices according to the invention at temperatures below 0° C., it is possible to add to the liquid crystal an anti-freeze, such as e.g. ethylene glycol or to replace the water by formaldehyde.

In order to assist the electric or magnetic control of the optical devices according to the invention, it is possible to add to the liquid crystal a molecule which is preferably linear and/or highly electrically charged, such as polypeptides, polyelectrolytes and polysaccharides. This makes it possible to increase the optical birefringence of the liquid crystal. The greater the coupling between the added molecule and the aggregates the more the birefringence increases.

It is also possible to add to the liquid crystals optically active molecules, such as brucine, cholesterol or derivatives thereof, so that the liquid crystals have a cholesteric phase. These additives represent less than 50 and preferably less than 10% by weight of the liquid crystal.

In order to simplify the optical devices according to the invention, which are electrically or magnetically controllable, by eliminating the crossed polarizers generally used on either side of the liquid crystal film, dichroic dyes can be introduced into the liquid crystal.

BRIEF DESCRIPTION OF THE DRAWING FIGURES

Other features and advantages of the invention can be gathered from the following description given in an illustrative and non-limitative manner with reference to the attached drawings, wherein show:

FIG. 1 Diagrammatically and in perspective a greenhouse according to the invention.

FIG. 2 Diagrammatically and in perspective one of the panels of the greenhouse of FIG. 1, according to a first variant.

FIGS. 3a and 3b diagrammatically one of the panels of the greenhouse according to FIG. 1, in a second variant.

FIG. 4a diagrammatically a first variant of a thermally controlled, matrix display device according to the invention.

FIG. 4b diagrammatically a second variant of a thermally controlled, matrix display device according to the invention.

FIG. 5 diagrammatically and in longitudinal section an electrically controlled, matrix display device according to the invention.

FIGS. 6a and 6b diagrammatically and in accordance with a first variant, a magnetically controlled, matrix display device according to the invention.

FIG. 7 diagrammatically a second variant of a magnetically controlled, matrix display device according to the invention.

FIG. 8 a ternary phase diagram of a composition of pentanol, cyclohexane, water and tetradecyl trimethyl ammonium bromide at ambient temperature.

DETAILED DESCRIPTION OF THE PREFERRED EMBODIMENTS

Figure 1:
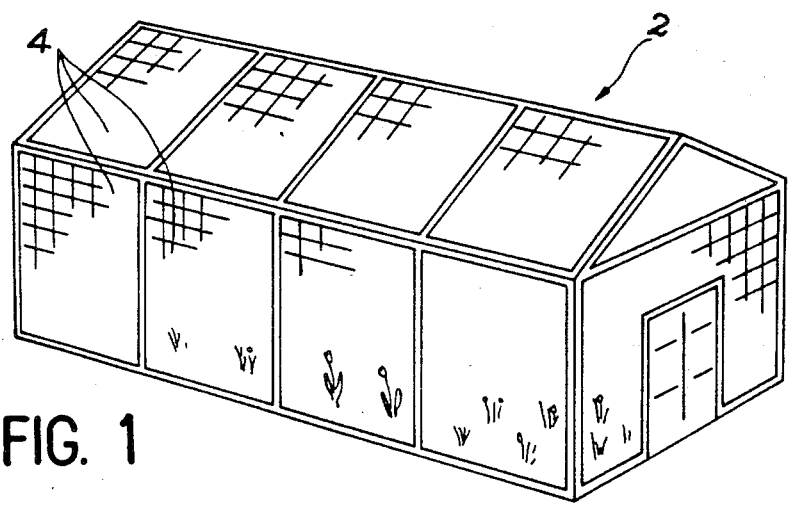
Figure 2:
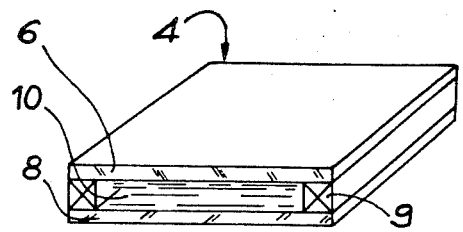

With reference to FIGS. 1 and 2, the optical device according to the invention can be a greenhouse 2 formed from a plurality of panels 4 fixed to one another, particularly by bonding, each panel being subdividable into several elementary cells. Each panel or elementary cell is formed by two glass, or polyethylene walls 6 and 8, kept spaced from one another and joined at their edges with the aid of a sealing joint 9. The space defined between the two walls 6 and 8 is filled by a lyotropic liquid crystal 10 according to the invention, which is of the thermally controllable type, the liquid crystal thickness being approximately one millimeter.

At ambient temperature, the liquid crystal 10 is transparent and sunlight can penetrate the greenhouse. The temperature in the greenhouse then increases and consequently so does that of the liquid cell, so that it is then made opaque to sunlight. The inventor assumes that the liquid crystal is then in the form of aggregates, whose length is roughly the same as the wavelength of light, which produces a diffusion of the latter.

When the temperature within the greenhouse decreases, the liquid crystal again becomes transparent, thus permitting the sunlight to again penetrate the greenhouse. In this way and in a very simple manner, there is an automatic regulation of the temperature within the greenhouse.

Figures 3A, 3B:
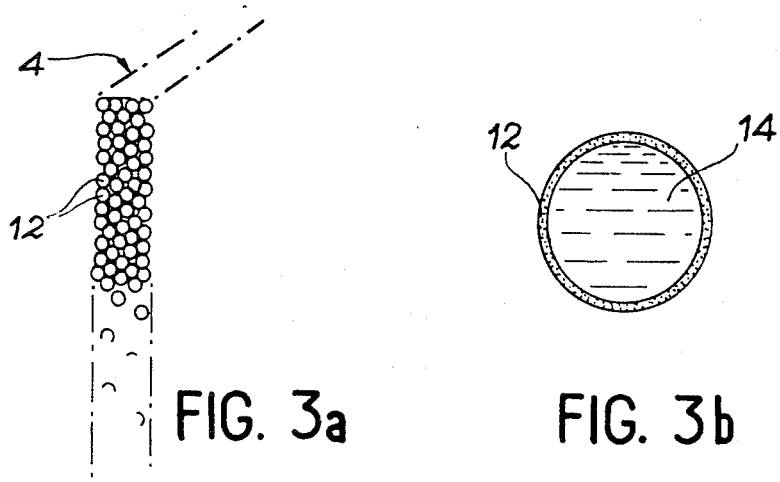

Instead of having a continuous liquid crystal film between two glass walls, as shown in FIGS. 3a and 3b, it is possible to produce the panels 4 of the greenhouse in the form of polyethylene capsules or microcapsules 12, which are joined to one another and whereof each contains the liquid crystal 14, as defined with reference to FIGS. 1 and 2. These microcapsules can optionally be embedded in a transparent substrate, in particular glass.

The use of microcapsules makes it possible to reduce, or even eliminate the double glazing of greenhouses, thus making it possible to reduce the cost of such greenhouses and prevent, in the case of a panel breaking, the spreading of the liquid crystal film. This leads to a better managability than that of glass plates.

Figure 4A:
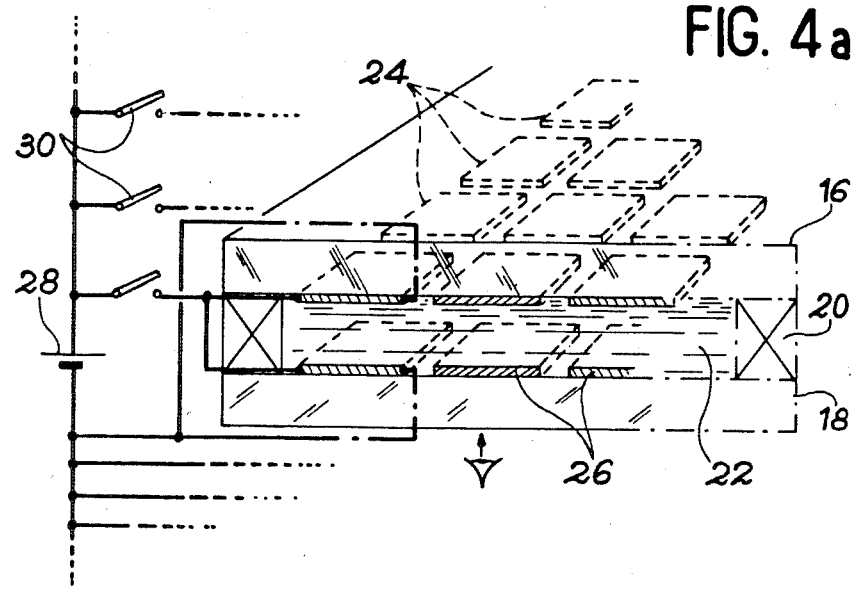

The optical device according to the invention can also comprise a thermally controlled matrix display device, as shown in FIG. 4a.

In simplified terms, this device, operating by transmission, comprises two transparent walls 16, 18, e.g. of glass or plastic, which are welded by their edges using a sealing joint 20 and defining between them a space filled with a lyotropic liquid crystal 22, as defined relative to FIGS. 1 and 2.

The inner faces of the walls 16 and 18 of the display device are respectively provided with matrix-distributed, transparent heating resistors 24, 26, each heating resistor 24 facing a heating resistor 26. Each pair of resistors 24, 26 of the type used in photocopiers or printers, defines an image point of the display device.

Each pair of heating resistors 24, 26 is connected to the terminals of an electric power supply 28. A switch 30 associated with each pair of resistors 24, 26 permits the supply or non-supply of current to each pair of resistors. The supply of current to each pair of resistors makes the liquid crystal facing the resistors pass from the transparent state to the opaque state, or conversely from the opaque state to the transparent state.

The closing and opening of the different switches 30 can be automatically controlled. Moreover, the number of electric power supplies 28 necessary for the current supply of all the heating resistors is dependent on the number of the latter and the intensity of the current supplied by the power supplies.

Figure 4B:
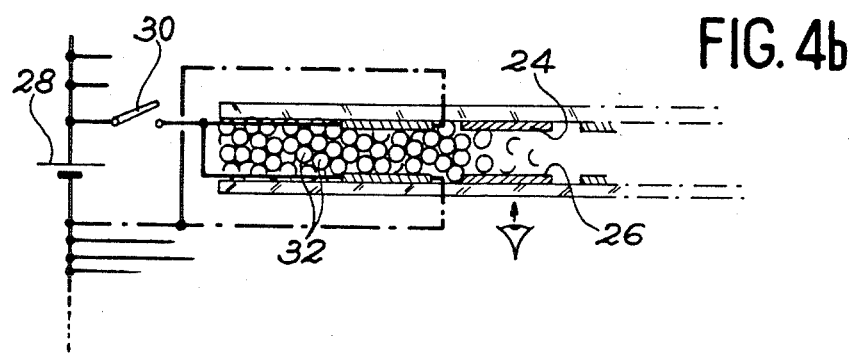

The device shown in FIG. 4a can be used for large screen displays e.g. used in stations or airports. In place of a continuous liquid crystal film 22, it is possible to use in the manner shown in FIG. 4b microcapsules 32, which are integral with one another and whereof each contains a liquid crystal (cf. e.g. FIG. 3b).

In order to obtain a homogeneous dipslay, the microcapsules 32 must be identical and in particular contain the same liquid crystal. The other parts of the device remain unchanged compared with FIG. 4a.

Figure 5:
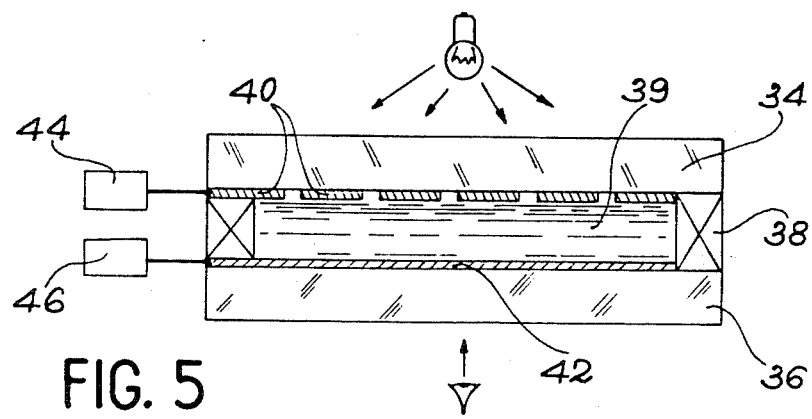

As shown in FIG. 5, the optical device according to the invention can also be an electrically controlled matrix display. This device also comprises two insulating walls, in particular of glass 34, 36, which are kept spaced from one another and welded together by their edges using a sealing joint 38. The space defined between walls 34 and 36 contains a lyotropic, nematic, liquid crystal film 39 according to the invention and which is electrically controlled.

The inventor has found that the aggregates constituting the liquid crystal have a dielectric anisotropy, i.e. their orientation is controllable by an electric field. He supposes that when the aggregates are of reduced size, said orientation is controllable by a small amplitude signal.

To this end, the inner face of wall 34 is provided with a transparent electrode 40 (e.g. $SnO_2$) appropriate for display purposes (dot matrix, segments) and the inner face of the wall 36 is provided with a transparent counterelectrode 42 (e.g. $SnO_2$).

Known control and supply circuits 44 and 46, respectively connected to electrode 40 and counterelectrode 42 make it possible to apply to said electrode and said counterelectrode, the necessary exciting signals for the orientation of the aggregates in a desired direction and in punctiform manner. These signals can be continuous or alternating.

In order to increase the optical birefringence of the liquid crystal 39, the aggregates can contain ferromagnetic particles and in particular magnetite particles. Moreover, a colour display is made possible by the addition of dichroic dyes.

In the place of a continuous liquid crystal film 39, it is possible (cf. FIGS. 3a, 3b and 4b) to use microcapsules, each of which contains a little liquid crystal, said microcapsules optionally being embedded in a solid substrate.

The selective orientation of the aggregates makes it possible to pass from the birefrigent state to the isotropic or homeotropic state.

As shown in FIGS. 6a and 6b, the optical device according to the invention can also be a magnetically controlled, or more precisely electromagnetically controlled matrix display device. For each image point, said device comprises a nematic, lyotropic, liquid crystal film 48 according to the invention containing ferromagnetic particles inserted between a thin soft iron wall 50 and a transparent, more particularly glass wall 52. A joint 54 joins the soft iron layer 50 and the insulating wall 52 together by their edges.

A coil 56 surrounds the soft iron layer 50 and is connected to the terminals of an electric power supply 58, via a switch 60. The closing of switch 60 makes it possible to produce a magnetic field within the liquid crystal film 48 making it possible to orient the aggregates in accordance with this field. The lines of force of the magnetic field shown in FIG. 6a carry the reference 62.

The inventor has found that the aggregates have a magnetic anisotropy, i.e. their orientation is controllable by a magnetic field.

Bearing in mind the limited thickness of the liquid crystal 48 (approximately 5 to 10 $\mu$m), the magnetic force lines within the elementary tight call can be considered as perpendicular to the soft iron layer 50 and to the wall 52 of the display device.

FIG. 6b shows a complete matrix display device having several soft iron studs 50, each surrounded by a coil 56. Each stud 50 defines an image point.

In view of the opacity of the soft iron studs 50, said display device functions by reflecting light on said soft iron studs.

It is also possible to produce each image point in the manner shown in FIG. 7. In this embodiment, each soft iron stud 50 constituting the upper wall of an elementary liquid crystal cell is replaced by a transparent glass wall.

The orientation of the aggregates is obtained by applying to the elementary cell a magnetic field symbolized by arrow 64, produced within a solenoid 66, whose ends are connected to the terminals of an electric power supply 68, via a switch 70.

Observation of the display takes place in a direction coinciding with that of the magnetic field.

The various optical devices given hereinbefore have oly been given for illustration purposes and other optically, electrically or magnetically controlled devices can be envisaged without passing beyond the scope of the invention.

In the thermally controlled optical devices according to the invention (cf. FIGS. 1 to 4b), the liquid crystal must be at the stability limit and the way in which the latter is obtained will be described hereinafter.

The obtaining of a liquid crystal is critically dependent on the co-surfactant quantity. Thus, the latter is distributed between the polar liquid, the oil and the surfactant and the temperature change modifies said distribution leading to a stabilization or destabilization of the liquid crystal phase. A co-surfactant excess leads to the destruction of the liquid crystal phase.

During the destabilization of the liquid crystal, the solution passes from the transparent state (probably corresponding to large aggregates) to the opaque state (probably corresponding to aggregates with size close to or below the wavelength of light). A similar effect is obtained by using an electrolyte dissolved in the polar liquid.

In order to produce liquid crystals at the stability limit, the surfactant quantity is firstly fixed and then at the chosen operating temperature, e.g. ambient temperature, the phase diagram of the other three constituents is plotted (oil, polar liquid and co-surfactant). The limits of the liquid crystal phase are then determined and liquid crystal compositions are prepared close to these limits.

Figure 8:
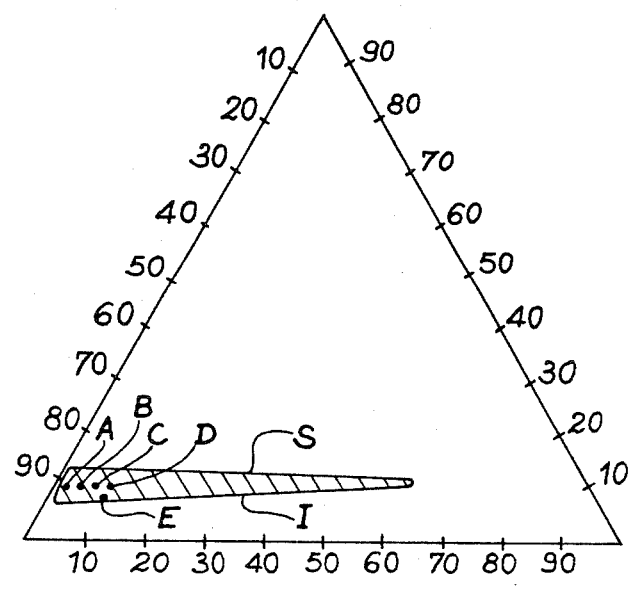

FIG. 8 shows a ternary phase diagram of a microemulsion containing cyclohexane, pentanol and an aqueous 0.2M tetradecyl trimethyl ammonium bromide solution at ambient temperature.

Points A, B, C and D located below the upper limit S of the liquid crystal phase correspond to liquid crystal compositions which are transparent at ambient temperature (20° C.) and which are opaque at 45° C.

The composition at point A corresponds to 2 ml of an aqueous 0.2M tetradecyl trimethyl ammonium bromide solution to which has been added 0.04 ml of cyclohexane and 0.22 ml of pentanol.

The composition at point B corresponds to 2 ml of an aqueous 0.2M tetradecyl trimethyl ammonium bromide solution, to which has been added 0.08 ml of cyclohexane and 0.154 ml of pentanol.

Point C corresponds to 2 ml of an aqueous 0.2M tetradecyl trimethyl ammonium bromide solution, to which has been added 0.12 ml of cyclohexane and 0.15 ml of pentanol.

Finally, for point D, 0.20 ml of cyclohexane and 0.20 ml of pentanol have been added to 2 ml of aqueous 0.2M tetradecyl trimethyl ammonium bromide solution.

For comparison purposes, a liquid crystal composition is prepared, which contains 2 ml of an aqueous 0.2M tetradecyl trimethyl ammonium bromide solution, 0.20 ml of cyclohexane and 0.15 ml of pentanol. This composition is represented by point E on the phase diagram, which is close to the lower limit I of the liquid crystal phase. It is opaque at ambient temperature (20° C.) and transparent at 5° C.

For illustration purposes, a number of lyotropic composition examples are given hereinafter, which have liquid crystal properties and which are usable in devices according to the invention.

| COMPOSITION 1 | |
| --- | --- |
| Tetradecyl trimethyl ammonium bromide | 0.145 g |
| Pentanol | 0.165 ml |
| Water | 2.0 ml |
| Cyclohexane | 0.1 ml |

This liquid crystal is transparent at ambient temperature (20° C.) and becomes opaque on heating it to 36° C. It can be used in the devices shown in FIGS. 1 to 4b.

| COMPOSITION 2 | |
|---|---|
| Tetradecyl trimethyl ammonium bromide | 0.133 g |
| Pentanol | 0.154 ml |
| Cyclohexane | 0.08 ml |
| Water | 2 ml |

This crystal is transparent at ambient temperature and becomes opaque between 32° and 42° C.

At ambient temperature, it transmits 99% of a light beam and at 42° C. only 3% of the incident light is transmitted for a layer of one millimeter. This effect occurs both in the visible, the infrared or the ultraviolet ranges. This liquid crystal can be used in the devices shown in FIGS. 1 to 4b.

| COMPOSITION 3 | |
|---|---|
| Tetradecyl trimethyl ammonium bromide | 0.133 g |
| Pentanol | 0.30 ml |
| Cyclohexane | 0.08 ml |
| Water | 2 ml |

This liquid crystal is transparent at ambient temperature and becomes opaque on raising the temperature between 40° and 50° C. It can be used in the devices shown in FIGS. 1 to 4b.

| COMPOSITION 4 | |
|---|---|
| Tetradecyl trimethyl ammonium bromide | 0.35 g |
| Pentanol | 0.19 ml |
| Water | 1.2 ml |
| Cyclohexane | 0.1 ml |

This compound is transparent at ambient temperature (20° C.) and becomes opaque at a temperature of approximately 25° C. It can be used in the devices shown in FIGS. 1 to 4b.

| COMPOSITION 5 | |
|---|---|
| Tetradecyl trimethyl ammonium bromide | 0.58 g |
| Pentanol | 0.65 ml |
| Cyclohexane | 0.35 ml |
| Water | 8 ml |

This composition is transparent at ambient temperature and becomes opaque through heating to a temperature of 40° C.

| COMPOSITION 6 | |
|---|---|
| Sodium dodecyl sulphate | 0.56 g |
| Pentanol | 1.1 ml |
| Cyclohexane | 0.3 ml |
| Water | 5 ml |

This liquid crystal can be used in the devices shown in FIGS. 1 to 4b.

| COMPOSITION 7 | |
|---|---|
| Potassium oleate | 0.2 g |
| Pentanol | 0.325 ml |
| Cyclohexane | 0.2 ml |
| Water | 2 ml |

| COMPOSITION 8 | |
|---|---|
| Tetradecyl trimethyl ammonium bromide | 0.3 g |
| Pentanol | 0.5 ml |
| Cyclohexane | 2 ml |
| Water | 0.02 ml |

This liquid crystal has a low electrical conductivity and can be used in the electrically control device shown in FIG. 5.

| COMPOSITION 9 | |
|---|---|
| Tetradecyl trimethyl ammonium bromide | 2.1 g |
| Butanol | 1 ml |
| Octane | 7 ml |
| Water | 1 ml |

This liquid crystal has a low electrical conductivity and can be used in electrically controlled devices like those shown in FIG. 5.

| COMPOSITION 10 | |
|---|---|
| Tetradecyl trimethyl ammonium bromide | 0.35 g |
| Pentanol | 0.19 ml |
| Cyclohexane | 1.4 ml |
| Water | 0.6 ml |

This liquid crystal has a low electrical conductivity and can be used in electrically controlled devices like those shown in FIG. 5.

| COMPOSITION 11 | |
|---|---|
| Tetradecyl trimethyl ammonium bromide | 0.3 g |
| Butanol | 0.1 ml |
| Cyclohexane | 2 ml |
| Water | 0.1 ml |

This liquid crystal has a low electrical conductivity and a low viscosity (approximately 10 cp). It can be used in an electrically controlled device, like that shown in FIG. 5.

| COMPOSITION 12 | |
|---|---|
| Tetradecyl trimethyl ammonium bromide | 0.15 g |
| Butanol | 0.1 ml |
| Cyclohexane | 2 ml |
| Water | 0.1 ml |

This liquid crystal has a low viscosity (approximately 10 cp) and can be used in an electrically controlled optical device, e.g. according to FIG. 5.

| COMPOSITION 13 | |
|---|---|
| Potassium oleate | 0.32 g |
| Pentanol | 0.14 ml |
| Cyclohexane | 1.7 ml |
| Water | 0.26 ml |

This liquid crystal can be used in a display device, like that shown in FIG. 5.

In exemplified manner, a description is given hereinafter of obtaining a liquid crystal, whose aggregates contain magnetic particles. This liquid crystal can be used in electrically or magnetically controlled optical devices, like those shown in FIGS. 5 to 7.

EXAMPLE

A first solution is formed by dissolving 0.3 g of tetradecyl trimethyl ammonium bromide (surfactant) in 2 ml of cyclohexane (oil) and 0.05 ml of pentanol (co-surfactant). To the mixture obtained is added 0.2 ml of an aqueous 1.7 molar $FeCl_3$ solution. The mixture is then stirred for a few seconds until the aqueous phase is dispersed in the cyclohexane.

In parallel, a second solution is prepared, which contains the same proportions of cyclohexane, pentanol and tetradecyl trimethyl ammonium bromide and to it is added 0.2 ml of a 1.7 molar aqueous $FeCl_2$ solution in place of the $FeCl_3$ solution.

Finally, a third solution is prepared, which contains 1.8 g of tetradecyl trimethyl ammonium bromide, 12 ml of cyclohexane, 0.3 ml of pentanol and 1.2 ml of 12M ammonium hydroxide.

The three aforementioned solutions are then mixed. The chemical reaction, which is complete after a few minutes, leads to a chestnut coloured ferromagnetic liquid crystal having optical birefringence properties much better than those of a similar composition not containing ferromagnetic particles in the dispersed phase, in this case water.

I claim:

1. Optical device having a liquid crystal comprising a microemulsion (10,14,22) which has two stable optical states, namely a transparent state and an opaque state which can be controlled, characterized in that the liquid crystal (10,14,22) has a lamellar structure in the transparent state and a nematic lamellar structure in the opaque state, said two states being thermally controllable and that it contains 1 to 45% by weight of a surfactant, 0 to 45% by weight of a co-surfactant, 0 to 98% by weight of oil and 1 to 99% by weight of polar liquid, the ratio of the co-surfactant mass to the surfactant mass being below 2.

2. Optical device according to claim 1, characterized in that it contains 5 to 20% by weight of surfactant, 0 to 20% by weight of co-surfactant, 0 to 94% by weight of oil and 1 to 95% by weight of polar liquid.

3. Optical device according to claim 1, characterized in that the polar liquid constitutes the dispersed phase of the microemulsion and the oil the continuous phase.

4. Optical device according to claim 1, characterized in that the oil constitutes the dispersed phase of the microemulsion and the polar liquid the continuous phase.

5. Optical device having a liquid crystal (39,48) with two stable states which can be controlled, characterized in that said liquid crystal (39,48) is a nematic containing 1 to 45% by weight of surfactant, 1 to 45% by weight of co-surfactant, 1 to 97% by weight of oil and 1 to 97% by weight of a polar liquid, the ratio of the co-surfactant mass to the surfactant mass being below 2 and the four constituents form elongated aggregates, dispersed in a continuous liquid phase, whose length exceeds the distance separating two consecutive aggregates, the orientation of these aggregates being electrically or magnetically controllable.

6. Optical device according to claim 5, characterized in that it contains 1 to 45% by weight of surfactant, 1 to 45% by weight of co-surfactant, 50 to 97% by weight of oil and 1 to 48% by weight of water, the orientation of the aggregates being electrically controllable.

7. Optical device according to claim 5, characterized in that the liquid crystal contains 5 to 20% by weight of surfactant, 1 to 20% by weight of co-surfactant, 5 to 93% by weight of oil and 1 to 44% by weight of polar liquid.

8. Optical device according to claim 5, characterized in that the distance separating two consecutive aggregates is between 7 and 300 nm.

9. Optical device according to claim 5, characterized in that the aggregates contain ferromagnetic particles.

10. Optical device according to claim 9, characterized in that the ferromagnetic particles are magnetite particles ($Fe_3O_4$).

11. Optical device according to claim 5, characterized in that the polar liquid constitutes the dispersed phase and the oil constitutes the continuous phase.

12. Optical device according to claim 1, characterized in that the polar liquid is water.

13. Optical device according to claim 1, characterized in that the polar liquid contains an electrolyte.

14. Optical device according to claim 1, characterized in that the electrolyte is chosen from among a basic hydroxide or an inorganic salt.

15. Optical device according to claim 1, characterized in that the oil is a hydrocarbon chosen from among saturated hydrocarbons, unsaturated hydrocarbons and cyclic hydrocarbons.

16. Optical device according to claim 1, characterized in that the oil is a hydrocarbon chosen from among benzene, toluene, cyclohexane, octane, decane, a derivative of these hydrocarbons or a mixture of these hydrocarbons.

17. Optical device according to claim 1, characterized in that the surfactant is chosen from the group including fatty acid salts with a long hydrocarbon or fluorocarbon chain, quaternary ammonium halides and alkyl sulphates or sulphonates of an alkali metal.

18. Optical device according to claim 1, characterized in that the surfactant is chosen from among tetradecyl trimethyl ammonium bromide, sodium dodecyl sulphate and potassium oleate.

19. Optical device according to claim 1, characterized in that the co-surfactant is formed by at least one alcohol.

20. Optical device according to claim 1, characterized in that the co-surfactant is chosen from among butanol, pentanol and hexanol.

21. Optical device according to claim 1, characterized in that the liquid crystal has a viscosity between 0.1 and 100 centipoises.

22. Optical device according to claim 5, characterized in that the liquid crystal contains an anti-freeze.

23. Optical device according to claim 1, characterized in that the liquid crystal contains optically active molecules.

24. Optical device according to claim 1, characterized in that the liquid crystal contains diochroic dyes.

25. Optical device according to claim 1, characterized in that the liquid crystal is located in capsules or microcapsules (12, 32).

26. Optical device according to claim 1, characterized in that the surfactant is tetradecyl trimethyl ammonium bromide, the co-surfactant is pentanol, the oil is cyclohexane and the polar liquid is water.

27. Optical device according to claim 1, characterized in that the surfactant is sodium dodecyl sulphate, the co-surfactant is pentanol, the oil is cyclohexane and the polar liquid is water.

28. Optical device according to claim 1, characterized in that the surfactant is potassium oleate, the co-surfactant is pentanol, the oil is cyclohexane and the polar liquid is water.

29. Optical device according to claim 5, characterized in that the surfactant is tetradecyl trimethyl ammonium bromide, the co-surfactant is butanol, the oil is octane and the polar liquid is water.

30. Optical device according to claim 5, characterized in that the surfactant is tetradecyl trimethyl ammonium bromide, the co-surfactant is butanol, the oil is cyclohexane and the polar liquid is water.

* * * * *